W. W. BRADLEY.
MACHINE FOR MAKING BEAD CHAINS.
APPLICATION FILED MAR. 28, 1913.
1,130,253.
Patented Mar. 2, 1915.
7 SHEETS—SHEET 5.
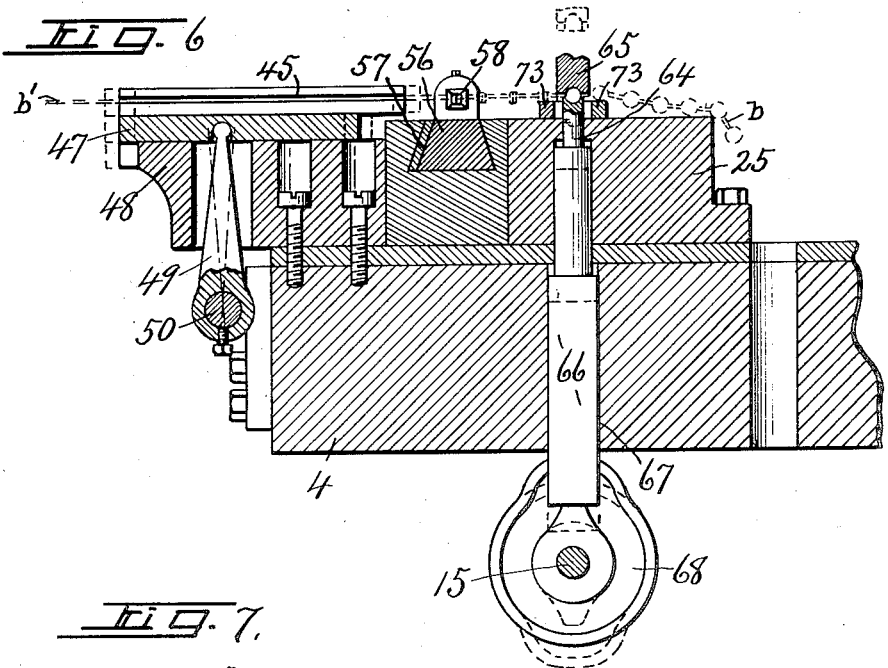
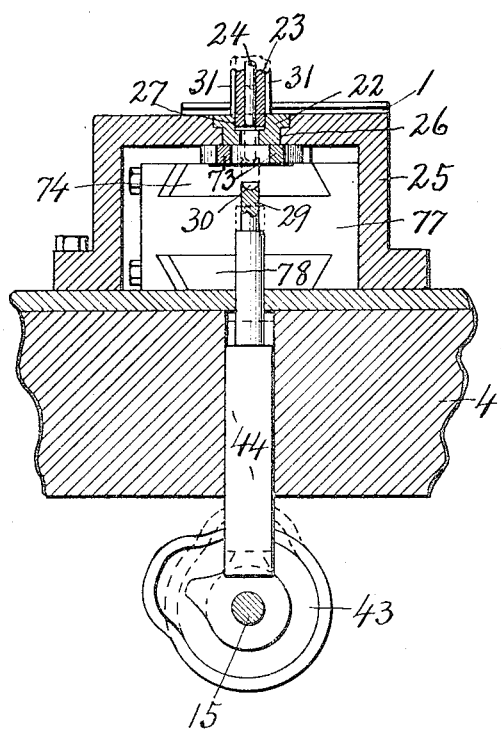
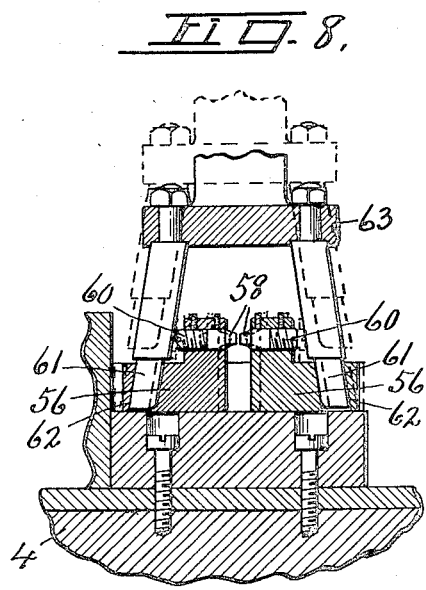
INVENTOR.
W. W. Bradley
BY
Howard P. Denison
ATTORNEY.

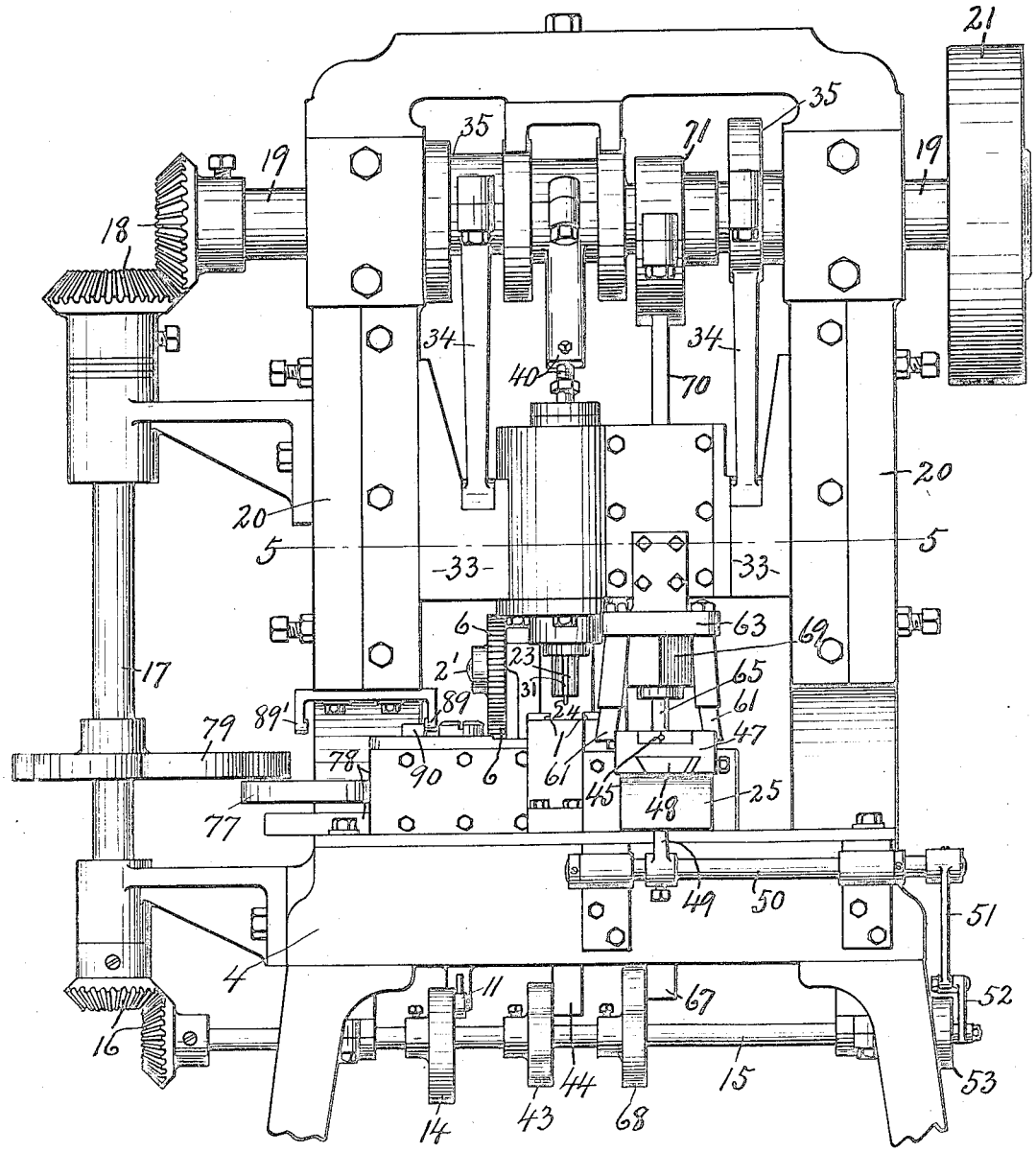

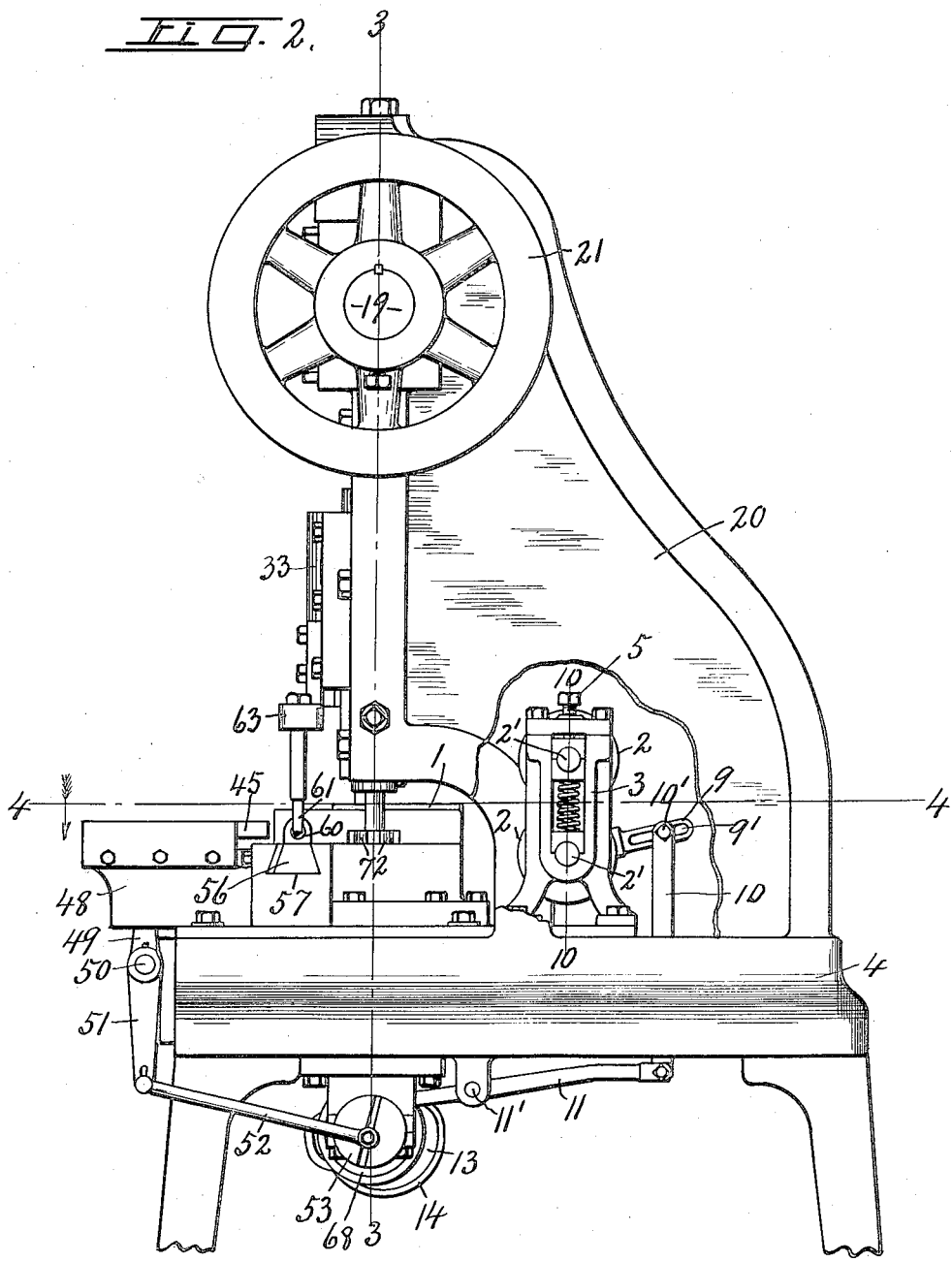

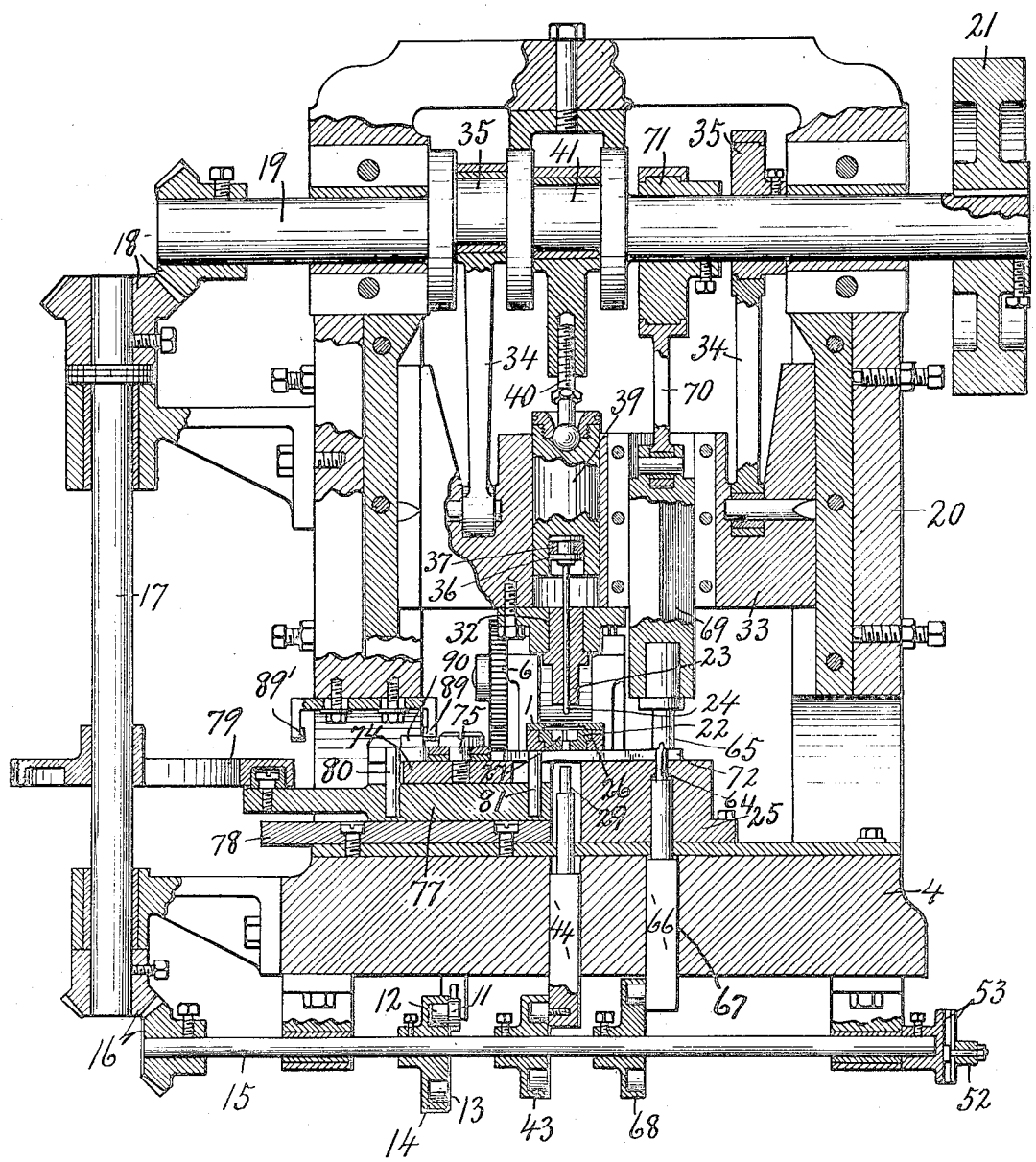

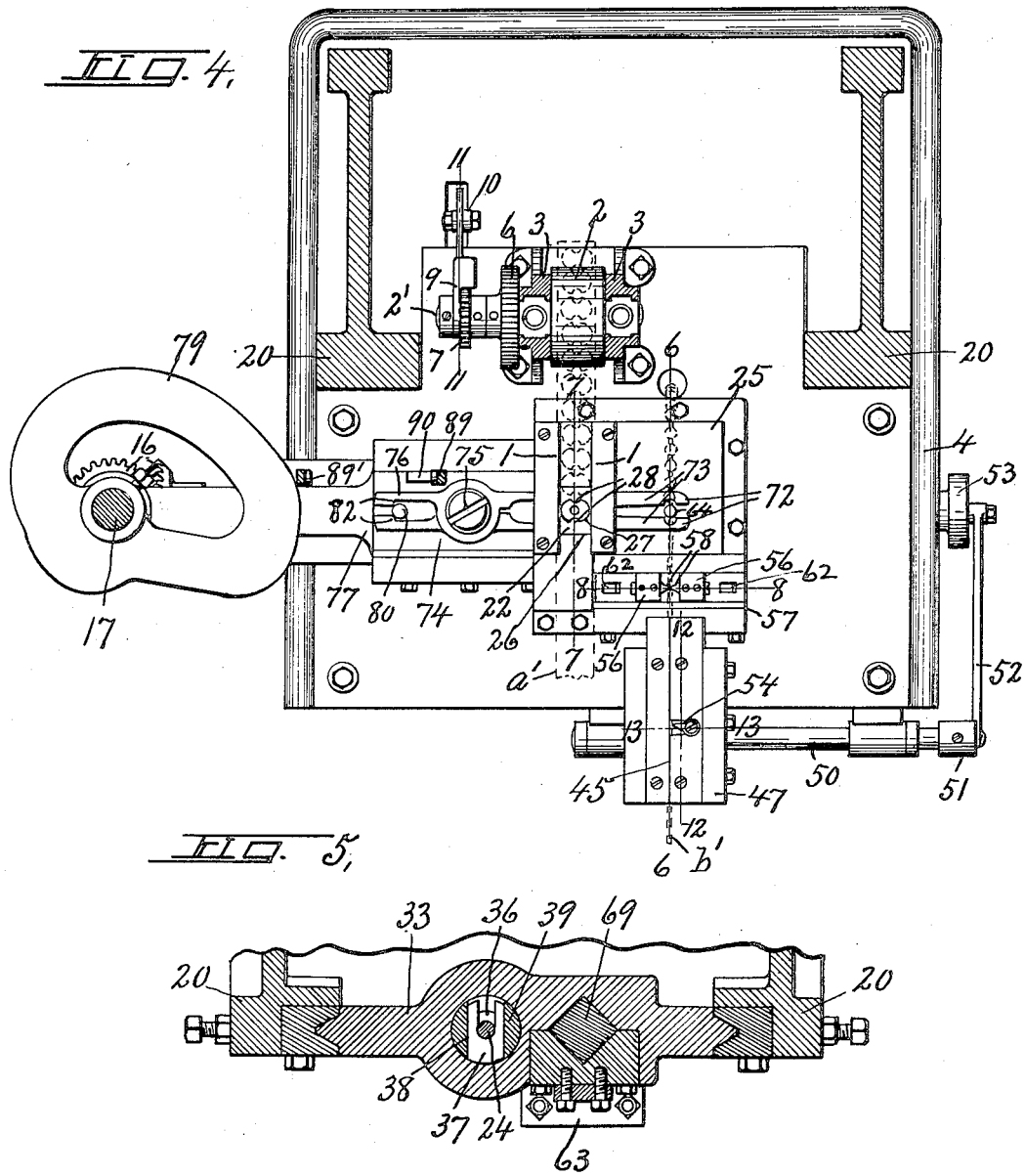

W. W. BRADLEY.
MACHINE FOR MAKING BEAD CHAINS.
APPLICATION FILED MAR. 28, 1913.
1,130,253.
Patented Mar. 2, 1915.
7 SHEETS—SHEET 6.
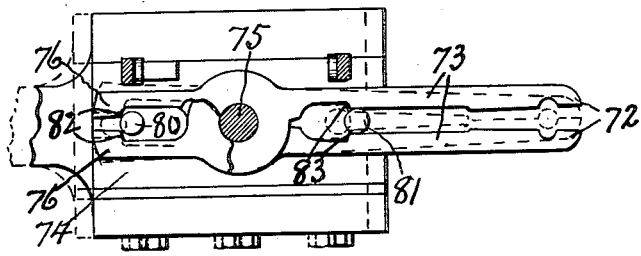
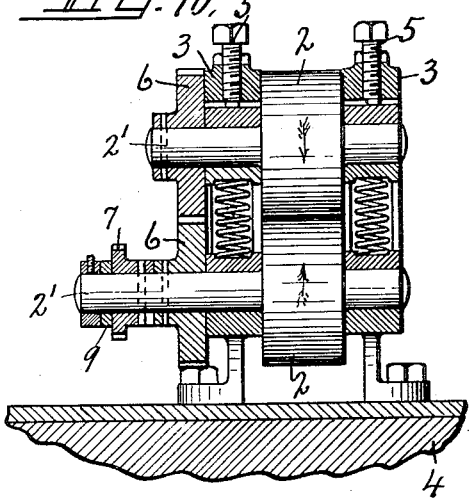
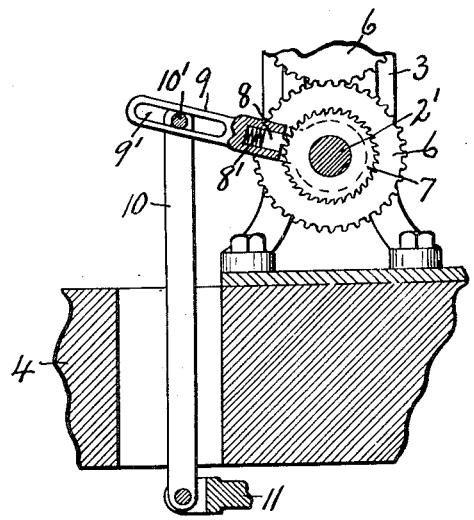
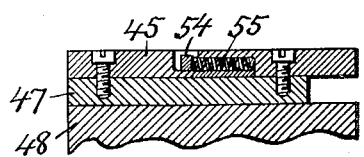
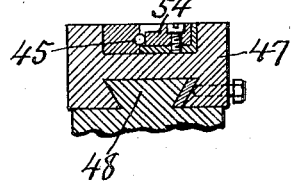
WITNESSES:
INVENTOR.
W. W. Bradley
BY
Howard Hudson
ATTORNEY.

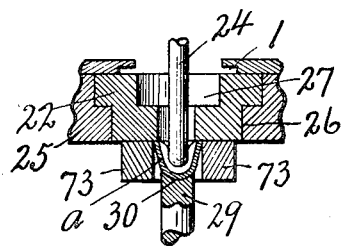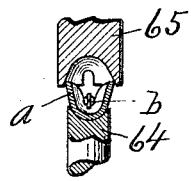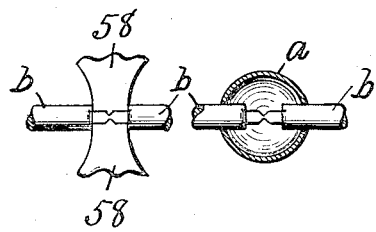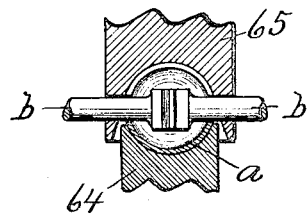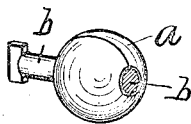

UNITED STATES PATENT OFFICE.

WILLIAM W. BRADLEY, OF SYRACUSE, NEW YORK, ASSIGNOR OF ONE-HALF TO WILLIAM L. DAY, OF SYRACUSE, NEW YORK.

MACHINE FOR MAKING BEAD CHAINS.

1,130,253.  Specification of Letters Patent.  Patented Mar. 2, 1915.

Application filed March 28, 1913. Serial No. 757,336.

*To all whom it may concern:*

Be it known that I, WILLIAM W. BRADLEY, of Syracuse, in the county of Onondaga, in the State of New York, have invented new and useful Improvements in Machines for Making Bead Chains, of which the following, taken in connection with the accompanying drawings, is a full, clear, and exact description.

This invention relates to certain improvements in machines for making bead chains of the class set forth in my Patent No. 1,051,384, issued January 28, 1913, and consisting briefly of a linear series of bar links or stems having their adjacent ends provided with radially projecting lugs and flexibly united or coupled together by hollow sheet metal beads embracing the lugs to form a continuous chain.

The main object of my present invention is to produce a machine capable of economically and expeditiously forming and assembling the links from continuous stock strips or bars of metal so that the several mechanisms for feeding, deforming and assembling such links will operate automatically and in synchronism to produce a completed chain of any length from the raw materials. In other words, I have sought to provide simple mechanical means for simultaneously forming and applying the beads in sequence upon and to the finned ends of the previously formed bar-links or stems, thereby producing the finished chain without further treatment.

Another object is to assemble the links in such manner as to establish a two-point bearing between each bead and end of the stem to which it is swiveled for the purpose of reducing friction and increasing the degree of angular adjustment of the links one upon the other.

Other objects and uses will be brought out in the following description.

In the drawings—Figures 1 and 2 are respectively a front elevation and a side elevation of the chain-forming machine embodying the various features of my invention, the lower portion of the frame being broken away. Figs. 3 and 4 are a longitudinal vertical sectional view and a horizontal sectional view of portions of the same machine taken respectively on lines 3—3 and 4—4, Fig. 2. Fig. 5 is a detail horizontal sectional view taken on line 5—5, Fig. 1. Figs. 6, 7 and 8 are detail vertical sectional views taken respectively on lines 6—6, 7—7 and 8—8, Fig. 4. Fig. 9 is an enlarged top plan of the detached gripping and feeding jaws for the partially formed beads showing also the supporting carriage and means for opening and closing the jaws. Figs. 10 and 11 are detail vertical sectional views taken respectively on lines 10—10, Fig. 2, and 11—11, Fig. 4. Figs. 12 and 13 are detail vertical sectional views taken respectively on lines 12—12 and 13—13, Fig. 4. Fig. 14 is a perspective view of one of the detached dies for forming the lugs on the ends of the bar-links and partially severing said bars or links one from the other through and from the main wire. Fig. 15 is an enlarged detail sectional view of the dies for cupping the bead-blanks. Fig. 16 is an enlarged detail sectional view of the dies for forming the bead around the finned ends of the bar-links. Fig. 17 is an enlarged top plan of a series of bar-links in process of formation showing the dies for forming the fins or lugs and also showing one of the beads in section upon the adjacent ends of the bar-links. Fig. 18 is an enlarged face view of the adjacent ends of two of the bar-links just before separation and a sectional view of the spherical bead, after being formed on said ends. Fig. 19 is an enlarged perspective view of the completed bead and the adjacent ends of the stems united thereby.

The beads, as —*a*—, are preferably formed from thin, flat sheet metal strips of brass or equivalent material of any desired length and of such width as to reduce the waste to a minimum while the bar-links or stems, as —*b*—, are usually made of brass wire or equivalent material of suitable gage so that the lugs may be struck up in a single operation from the ends thereof and the ends severed one from the other without waste. The machine herein illustrated is adapted to cut, form, and assemble the links of the chain from continuous strips or wires which are delivered thereto from suitable reels (not shown) and comprises separate feeding means for the strip and wire, coöperative dies for cutting and cupping the bead-blanks, operating means for said dies, separate sets of dies for cutting and forming the bar-links, operating means for the link-forming dies, additional means for feeding the cupped bead-blanks to the finned ends of the bar-links, and further means for compressing the cupped bead-blanks around and upon the finned ends of the bar-links.

*Strip feeding means.*—The thin sheet metal strip, as —a'—, previously referred to may be mounted upon a suitable reel (not shown) at the front of the machine and drawn rearwardly through guide ways —1— by a pair of feeding rollers —2— which are journaled horizontally one above the other in suitable bearings in upright brackets —3— on the main supporting frame —4—, the bearings for the upper roller being adjustable by means of screws —5— to bring the meeting faces of the rollers into gripping engagement with the strip, whereby said strip is fed flatwise horizontally along and between the guides —1—. The feed rollers —2— are arranged at the rear of and in alinement with the guides —1— with their meeting faces in substantially the same horizontal plane as that of the guides and are provided with axially extending spindles —2'— having intermeshing gears —6— for rotating the rollers so that their meeting faces travel rearwardly, the lower spindle —2'— being provided with a ratchet wheel —7— rigid thereon and adapted to be engaged by a sliding pawl —8— on the adjacent end of a rock arm —9— which in turn is connected by a link —10— to one end of a lever —11— having its opposite end provided with a stud or roller —12— riding in a cam groove —13— of a rotary disk —14—. This disk —14— is secured to a horizontally disposed shaft —15— journaled in suitable bearings on the underside of the top of the frame —4— as shown more clearly in Fig. 3 and is connected by beveled gears —16— to an upright shaft —17— which in turn is connected by beveled gears —18— to a main horizontal driving shaft —19—, the latter being journaled in suitable bearings in the upper end of a bracket —20— and is provided with a driving pulley —21— adapted to be connected by a belt to any available source of power (not shown), the bracket —20— forming a part of and rising from the top of the main supporting frame —4— as shown more clearly in Figs. 2 and 3. The cam groove in the disk —14— is arranged to rock the lever —11— upon its pivot —11'— for imparting similar rocking movement to the rock arm —9— which is journaled on the lower spindle —2'— in close proximity to the outer face of the ratchet pawl —7— and is provided with a lengthwise socket open at its inner end for receiving the pawl —8— and a suitable actuating spring —8'—, shown more clearly in Fig. 11, one side of the teeth of the ratchet wheel and also one side of the tooth of the pawl being beveled to permit the pawl to ride over the face of the teeth when the outer end of the rock arm is moved upwardly while the opposite sides of the teeth and pawl are preferably radial to cause the pawl to operate the ratchet wheel and its spindle when the outer end of the rock arm is drawn downwardly.

The rock arm —9— is provided with a radial lengthwise slot —9'— for receiving a clamping screw —10'— on the upper end of the link —10—, thus permitting radial adjustment of the connection between the arm and link to vary the degree of intermittent feeding movement of the feed rollers —2— according to the length of the sheet metal blank which is required to form the bead, the clamping bolt —10'— being then tightened to hold the link in its adjusted position.

The cam disk —14— and its connections with its driving mechanism are constructed and timed so as to feed the strip intermittingly the desired distance or rather the length of one of the bead blanks after the cutting and gripping dies presently described have been withdrawn from their operative positions and before the next operation of such dies takes place and to cause the feeding rollers to remain at rest during the operation of said dies and for this purpose one side of the cam is somewhat flatter than the opposite side which is concentric with its axis of revolution, thereby causing the feeding rollers to operate rapidly during the short interval of separation of the dies.

*Cutting and cupping dies for bead-blanks.*—The guides —1— are arranged directly in front and parallel with the direction of movement of the meeting faces of the feed rolls —2— and are spaced some distance apart for receiving between them a relatively fixed female die —22— and a male die —23— together with a cupping plunger —24—, the guides —1— being mounted upon the top of a hollow bracket or housing —25— which is secured to the top of the main supporting frame. The die —22— is preferably made of hardened steel and tightly fitted in an opening —26— in the top of the housing —25— as shown more clearly in Fig. 7 and is provided with a central opening —27— therethrough for receiving the superposed male die —23— and cupping plunger —24—, the upper end of the opening being enlarged and elongated transversely and of substantially the same size and form as the coacting lower end of the male die —23— so that the two dies when in operative engagement shear with each other to cut the blank from the strip to the desired form to form a hollow spherical bead when operated upon by other dies hereinafter described, the lower reduced end of the opening being circular in plan and coaxial with but somewhat larger than the diameter of the cupping plunger —24— so as to allow the latter to force the cut blank for the bead through the reduced end of the opening and to the underside of the die —22— as shown more clearly in Fig. 15. The side walls of the upper enlarged end of the opening —27— are circular to conform to the curvature of the ends of the developed sphere when divided on a meridian line, the front and rear walls of said enlarged upper end of the opening being provided with opposite inwardly projecting ribs —28— shown somewhat exaggerated in Fig. 4 for cutting recesses in the ends of the blank to form stem-receiving apertures in the completed spherical bead shown in Fig. 19. The die —22— is of substantially the same thickness as the top of the housing —25— in which it is fitted and together with the male die —23— constitute the cutting dies for forming the bead-blank. The cupping plunger —24— coöperates with an underlying coaxial plunger —29— for deforming the flat blank into a cup-shape form, as shown more clearly in Fig. 15, the upper end of the plunger —29— being provided with a spherical recess —30— while the lower end of the cupping plunger —24— is also spherical but of smaller radius than that of the recess —30—. The upper face of the female cutting die —22— is substantially flat and coincident with the upper face of the housing —25— which forms the bottom of the guide —1— along which the strip for forming the bead-blanks is fed while the lower face of the superposed male die, which is movable vertically, is also substantially flat and provided with lengthwise recesses —31— in diametrically opposite sides thereof conforming to and registering with the ribs —28— in the front and rear walls of the enlarged upper end of the opening —27— so as to effect the cutting of the recesses in the ends of the bead blank previously referred to. The upper male cutting die —23— is also made of hardened steel and securely fitted in a suitable socket —32— in the lower end of a vertically movable cross head —33— as shown more clearly in Fig. 3, said cross head being reciprocated by connecting rods —34— having their upper ends journaled upon eccentrics —35— on the main driving shaft —19—, the eccentrics being of sufficient throw to move the lower end of the cutting die —23— into shearing engagement with its coöperative stationary die —22— when forced to its operative position and to withdraw said die —23— upwardly some distance above the guides —1— when in its extreme inoperative position.

The upper plunger —24— is movable independently of and through a central guide opening in the die —23— and for this purpose, its upper end is provided with a grooved head —36— for receiving a forked locking pin —37— which is slidably fitted in a diametrically extending slot —38— in the lower end of a vertically movable plunger —39—, Fig. 3, the upper end of said plunger —39— being connected by an adjustable screw-link —40— to an eccentric —41— on the central portion of the main driving shaft —19—. The two eccentrics —35— are shown as somewhat different but are of the same throw, the difference being only for the purpose of convenience in permitting the use of another cam or eccentric for operating the bead-finishing die hereinafter described. These cams —35— and —41— are adjusted and timed so as to cause the upper cutting die —23— to be moved into shearing engagement with its coacting female die —22— for cutting out the bead blank just in advance of the downward movement of the cupping plunger —24— which immediately follows the cutting operation of the die —23— to engage the central portion of the blank and force said blank through the reduced circular portion of the opening —27— just below the lower end of the die —22— at which time the plunger —29— is moved upwardly by means of a cam —43— and plunger —44— and engaged therewith. This cam —43— is constructed and timed so as to move the lower cupping die —29— upwardly into engagement with the depressed central portion of the bead blank just as the latter is forced through the lower end of the opening —27— by the upper cupping plunger —24— as shown in Fig. 15 ready to be carried laterally or transversely of the machine for application to the stems in a manner hereinafter described.

I have now described the mechanism for cutting and cupping the bead-blanks ready to be transferred and applied to the ends of the bar-links or stems but before describing the means for transferring these cup-blanks, I will now proceed to describe the means for forming the fins or lugs on the ends of the bar-links or stems. For this purpose I have provided the machine with a forwardly and rearwardly extending guide —45— which is located some distance to the right hand side of and parallel with the guide 1, Fig. 4, for receiving a continuous wire —$b'$— from the reel (not shown). This guide —45— preferably consists of a hardened steel block rigidly secured in a recess in the upper face of a forwardly and rearwardly movable carriage —47— which is guided in suitable ways —48— on the main supporting frame —4— and adapted to be operated by a rock-arm —49— having its lower end rigidly secured to a rock shaft —50— shown more clearly in Figs. 1, 2, and 6, said rock shaft being journaled upon the front side of the main supporting frame and is provided at one end with a crank arm —51— connected to one end of a link —52— having its opposite end adjustable and eccentrically connected to a rotary disk —53— on the shaft —15—. The object of the adjustable connection between the link —52— and the disk —53— is to vary the throw or forward and rearward movement of the carriage —47— according to the length of wire which may be required to form a single bar-link or stem. A wire-feeding pawl —54— is pivoted to the carriage —47— in the horizontal plane with the guide —45— to engage and feed the wire rearwardly as the carriage is moved in the same direction and to trail freely along the wire when the carriage is withdrawn, as shown more clearly in Figs. 4 and 13, said pawl being yieldingly held against the wire by means of a spring —55—, Fig. 12. The disk —53— and its connection with the carriage —47— constitutes means for intermittently feeding the wire to and between a pair of coacting transversely movable gripping jaws —56— which are guided in suitable ways —57— on the top of the frame —4— and are provided with coacting dies —58— or hardened steel adjustably mounted in transverse guides in the jaws —56— and adapted to be adjusted and held in their adjusted position by separate screws —60—. The object of these coacting dies —58— is two-fold, namely: to sever the wire and to flatten the adjacent ends and thereby form diametrically opposite radially projecting fins or lugs thereon projecting some distance beyond the periphery of the wire to form abutments for the retention of the spherical bead when molded to its spherical form therearound as will be hereinafter more fully explained. For this purpose the adjacent acting faces of the dies are provided with vertically elongated V-shaped ribs, forming knives, having their cutting edges registering with each other so as to cut through the wire from opposite sides, the remaining portions of the meeting faces of the dies at opposite sides of the ribs being substantially flat for flattening the adjacent ends of the wire and thereby striking up the radially projecting lugs or fins previously referred to simultaneously with the cutting operation of the V-shaped ribs. In practice, the jaws —56— and their dies —58— are adjusted so as to cut from opposite sides nearly through the wire, leaving an extremely thin web of just sufficient thickness to hold the ends together while the bead is being formed around such ends and sufficiently thin to easily break when the chain is completed and the links flexed one upon the other, thereby separating the bar-links and allowing them to be turned or flexed relatively to each other in the openings in the ends of the beads through which the cylindrical shanks of the bar-links project.

The dies —58— are preferably angular or square in cross section and are slidably fitted in correspondingly formed sockets in the jaws to hold them against turning with the cutting edges of their knives in exact alinement said dies and also the adjusting screws being held in their adjusted positions by set screws as shown more clearly in Fig. 8.

The jaws —56— are located just at the rear of the wire guide —45— so as to support the meeting edges of the dies 58 in exact register or horizontal alinement with said guide and are adapted to be operated simultaneously and positively in reverse directions by a pair of upwardly converging cam plungers —61— which are movable with an easy sliding fit in corresponding upwardly converging guide ways —62— in the outer ends of the jaws as shown more clearly in Fig. 8, the upper ends of said cam plungers being rigidly but detachably secured to a bracket —63— on the lower end of the cross head —33— for operating the jaws —56— to cut and form the bar links simultaneously with the cutting and cupping of the bead blanks.

After the bar links are formed in the manner just described with their ends united by the thin web previously referred to, they are advanced intermittingly the length of one bar space at a time to and between a pair of coaxial vertically reciprocating bead finishing dies —64— and —65— having spherical sockets in their meeting ends which are alined with the guide —45— and meeting ends of the dies —58—, the purpose of the dies —64— and —65— being to crimp or close the cup-shaped bead blanks around and upon the adjacent lugged ends of the bar links. The bead finishing dies —64— and —65— are also made of hardened steel, the die —64— being secured to the upper end of a vertically movable plunger —66— which is guided in suitable ways or openings —67— in the frame —4— and superposed block or housing —25— and is actuated positively in both directions by a rotary cam —68— on the shaft —15— as shown in Fig. 6. The upper die —65— is secured to the lower end of a vertically movable plunger —69—, Fig. 3, having its upper end connected by a link —70— to an eccentric —71— on the main driving shaft —19—, whereby positive reciprocatory movement is imparted to the upper die —65—, said dies —64— and —65— being disposed in approximately the same transverse vertical plane as the cutting dies —22— and —23— for the bead blanks while the eccentrics —68— and —71— are adjusted and timed so as to cause the meeting ends of the dies —64— and —65— to act upon opposite sides of the cupped blank and at opposite sides of the adjacent ends of the bar-links as the latter are fed into position between the dies —64— and —65— in a manner presently described for crimping or bending the cupped blanks around and upon the ends of said links.

After the bead blanks are cut by the dies —22— and —23— and cupped by the plungers —24— and —29—, the cupped blanks are left between and gripped by a pair of jaws —72— and thereby carried laterally or to the right (Fig. 4) from the dies —22— and —23— to a point between and in alinement with the finishing dies —64— and —65— directly beneath the adjacent ends of the link-bars which are then in position between said finishing dies to receive the finished bead. For this purpose, the jaws —72— are formed upon the right hand ends of a pair of levers —73—, Fig. 9, which levers are pivoted to each other and to a transversely movable carrier —74— by means of a pivotal pin or bolt —75—, said levers being also provided with heel extensions —76— at the opposite side of and somewhat shorter than the arms on which the jaws —72— are formed. The carrier —74— is slidably mounted in and upon a reciprocatory cross head —77— within the housing —25—, said cross head being guided upon a suitable way —78— on the top of the main frame —4— as shown more clearly in Figs. 3, 7, and 9 and is actuated by a cam —79— on the upright shaft —17—, Fig. 3. This carriage —74— is reciprocated by and through the greater part of the movement of the cross head —77— but has a slight independent movement relatively thereto for effecting the opening and closing of the jaws —72— and for this purpose the cross head is provided with a pair of studs or pins —80— and —81— arranged one in advance of the other in the direction of movement of said cross head and projecting between the shorter and longer arms of the levers —73— at opposite sides of their pivot —75— for engagement with cam shoulders —82— and —83— respectively. The shoulders —82— and —83— are also located at opposite sides of the pivot —75— for the levers a distance slightly less than the distance between the centers of the corresponding studs —80— and —81— so that when the jaw levers —73— are moved to their extreme right hand position as shown in Figs. 3, 4 and 9 for registration of the previously formed cupped bead blanks with the ends of the bar links, the stud or pin —80— will have moved therebetween to the inner ends of the shoulders —82— while the other pin —81— will have moved beyond the shoulders —83— for forcing the jaws open and thereby releasing the cupped blank ready to be operated upon by the dies —64— and —65—, the jaws —72— having their adjacent faces recessed to more effectively retain the cupped blank between them as the blank is fed from the dies —22— and —23— to the finishing dies —64— and —65—. The opposite ends of the carriage —74— are provided with longitudinally elongated slots for receiving the pins —80— and —81—, the inner ends of the slots being spaced apart a distance less than the distance between the inner faces of the pins so as to allow for the limited relative endwise movement of the carriage previously referred to and, when the carriage is moved to its extreme position toward the finishing dies in the manner just previously described, the pin —80— will have engaged the inner end wall of its slot while the other pin will have been moved a short distance from the inner end of the corresponding slot, the forward movement of the carriage in the direction referred to being limited by a stop —89— on the main supporting frame and adapted to engage the forward end of a lug —90— on the carriage as shown more clearly in Figs. 1, 3 and 9. Now, as the cross head —77— is withdrawn by its operating cam —79—, the frictional engagement of the carriage therewith will cause said carriage to also return until the opposite end of its lug —90— encounters the opposing stop —89'—, both of said stops being mounted upon a connecting bar which is secured for lengthwise adjustment to the underside of the overhanging portion of the upright bracket —20— as shown more clearly in Figs. 1 and 3. As soon as the lug —90— encounters the limiting stop —89'— on the return movement of the carriage and cross head, the carriage will be stopped from further return movement, thereby alining the jaws —72— with the cutting and cupping dies while the cross head will continue to move a short distance farther in the same direction or until its pin —81— reaches the inner end of the corresponding slot in the adjacent end of the carriage. During this extra movement of the cross head to the limit of its return position after the carriage is stopped, the pins —80— and —81— will be moved a corresponding distance sufficient to cause the pin —81— to return beyond the shoulders —83— while the pin —80— will be forced between the shoulders —82—, thereby closing the jaws upon the previously cupped blank which has been forced between the jaws by the operation of the cupping plungers —24— and —29—, it being understood that, as previously stated, the action of the cupping plungers —24— and —29— forces the bead blank through and below the guide —22—, thereby compressing the blank into cup form and causing its upper open end to engage the bottom of the die —22— by the slight expansion of the open end of the cupped blank taking place just after it leaves the die —22— and while between the jaws —72—. The cam —79— is constructed and timed so as to cause the jaws —72— to grip the cupped blank as soon as the latter is forced between the same after leaving the die —22—. Now, as the cross head —77— is moved forward from its starting position with the cupped blank held between the jaws, the frictional engagement between the carriage and cross head will cause said carriage to move therewith until the forward end of the lug —90— encounters the forward stop —89— which stops the carriage at the proper time for registering the cupped blank with the finishing dies —64— and —65—, whereupon the continued movement of the cross head a short distance in the same direction shifts the pins —80— and —81— to the position shown in Figs. 3 and 9, thereby opening the jaws in the manner previously described, this latter action being timed so as to take place just after the finishing dies —64— and —65— have been brought into position for closing the bead upon the lugged ends of the bar links.

The operation briefly described is as follows: The metal strip for forming the beads is inserted by hand in its guide while the machine is at rest and the dies withdrawn from their operative position until the forward end of the strip is caught between the feeding rollers —2—. In a similar manner, the wire for forming the bar links is fed by hand into its guide until it is in position to be engaged by the feeding pawls —54—, whereupon the machine may be started to automatically form the beads and bar links assembled one upon the other in the manner previously described, several mechanisms being synchronized and timed so as to operate without interference one with the other.

What I claim is:

1. In a machine for making bead chains, coacting dies for cutting sheet-metal bead-blanks, additional dies for cupping the blanks, means for forming bar-links with end heads, additional means for feeding the cupped bead-blanks into position to be applied to the links, and separate means for closing the cupped blanks onto the bar-links.

2. A machine for forming bead chains comprising wire feeding means, mechanism for cutting the wire into relatively short links, cupping-dies for the bead-blanks, and means for applying the cupped bead-blanks to the adjacent ends of adjacent links.

3. A machine for making bead chains comprising dies for cupping bead-blanks, means for displacing the cupped blanks from the dies to a certain position, means for feeding headed links into registration with the cupped blanks when in such position, and additional means for closing the cupped blanks upon the links.

4. In a machine of the character described, coacting dies for cutting flat sheet-metal bead-blanks, additional dies for cupping the blanks and displacing them one by one from the first named dies, separate coacting dies for forming radial lugs on the ends of bar-links, means for feeding the displaced cupped blanks to the last named dies, and additional means for closing the cupped blank onto the lugged ends of the bar-links.

5. A machine for making bead chains comprising dies for closing bead-blanks upon the links, link-heading dies at one side of the bead-closing dies, and means for feeding a wire to the heading dies and thence to the bead closing dies.

6. In a machine for making bead chains, the combination with intermittingly movable wire-feeding means of separate means for partially cutting the wire into small links and simultaneously heading the links while the wire-feeding means is at rest, additional means for feeding cupped bead-blanks into registration with adjacent heads of the links after the latter are displaced from the heading means, and separate dies for closing the cupped bead-blanks upon the heads of the links.

7. In a machine for making bead chains, the combination with means for feeding a strip of metal lengthwise intermittingly, coacting dies for cutting and cupping bead-blanks from the strip while the latter is at rest, means for feeding the cupped blanks to a predetermined position, separate means for depositing the ends of headed links into the cupped blanks when in such position, and additional means for closing the cupped blanks upon the heads of the links.

8. In a machine for making bead chains, means for feeding the wire intermittingly a predetermined distance, additional means for flattening portions of the wire and simultaneously cutting the flatted portions nearly through, and means for operating the last named means while the wire-feeding means is at rest.

In witness whereof I have hereunto set my hand this 15th day of March 1913.

WILLIAM W. BRADLEY.

Witnesses:
H. E. CHASE,
EVA E. GREENLEAF.